(12) United States Patent
Abe et al.

(10) Patent No.: US 11,409,486 B2
(45) Date of Patent: Aug. 9, 2022

(54) SYSTEM AND STORAGE MEDIUM

(71) Applicant: CANON KABUSHIKI KAISHA, Tokyo (JP)

(72) Inventors: Koichi Abe, Kanagawa (JP); Atsushi Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/379,312

(22) Filed: Jul. 19, 2021

(65) Prior Publication Data
US 2022/0027100 A1    Jan. 27, 2022

(30) Foreign Application Priority Data
Jul. 21, 2020  (JP) .............................. JP2020-124530

(51) Int. Cl.
*G06F 3/12*  (2006.01)

(52) U.S. Cl.
CPC ............ *G06F 3/126* (2013.01); *G06F 3/1204* (2013.01); *G06F 3/1236* (2013.01); *G06F 3/1292* (2013.01); *G06F 3/1296* (2013.01)

(58) Field of Classification Search
None
See application file for complete search history.

(56) References Cited

U.S. PATENT DOCUMENTS 10,708,434 B1 *  7/2020  Scheet ................... H04W 4/14
2019/0258431 A1 *  8/2019  Yamamoto ............ G06F 3/1238

FOREIGN PATENT DOCUMENTS

JP         2018207337 A     12/2018

\* cited by examiner

*Primary Examiner* — Paul F Payer
(74) *Attorney, Agent, or Firm* — Canon U.S.A., Inc., IP Division

(57) ABSTRACT

A system including a client terminal and server is provided. The client terminal includes a display controller configured to display a message transmitted from a user different from a user of the client terminal and a transmission unit configured to transmit a print request message including user identification information of the user different from the user of the client terminal and a file to be printed. The server includes a request unit configured to perform print request processing for printing the file to be printed by using a printing apparatus corresponding to the user identification information included in the print request message.

13 Claims, 16 Drawing Sheets

| CONNECTION ID | PRINTER ID | PRINTER MODEL | EXPIRATION DATE AND TIME |
|---|---|---|---|
| amskri6ej | 05001 | P0001 | DEC. 21, 2017 10:00 |
| krnbt58hr | 01052 | P0002 | DEC. 21, 2017 10:02 |
| 2sefjr6sd | 35126 | P0001 | DEC. 21, 2017 10:25 |
| r52wud6rz | 03679 | P0052 | DEC. 21, 2017 10:26 |
| abdbdc612 | 05001 | P0001 | DEC. 22, 2017 11:25 |

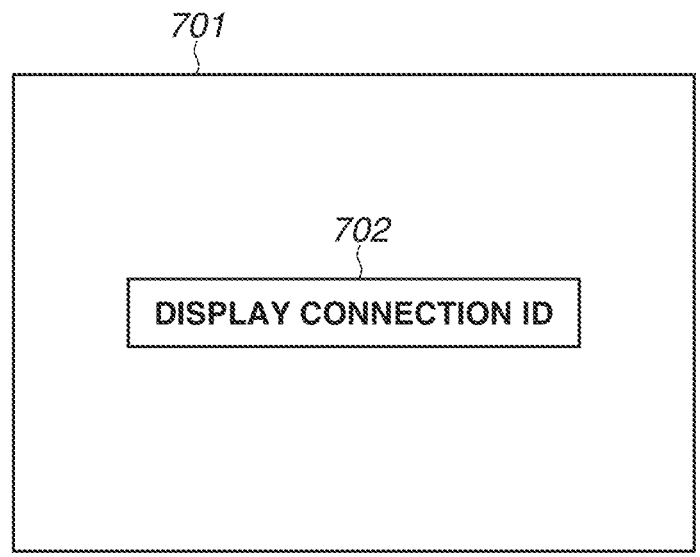
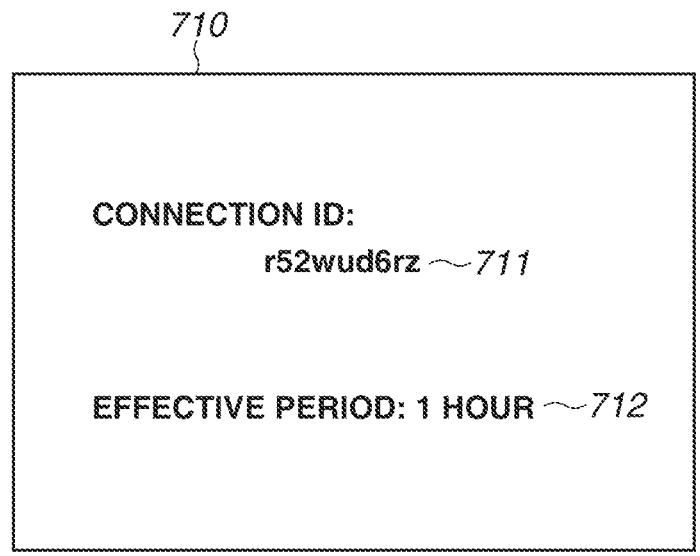

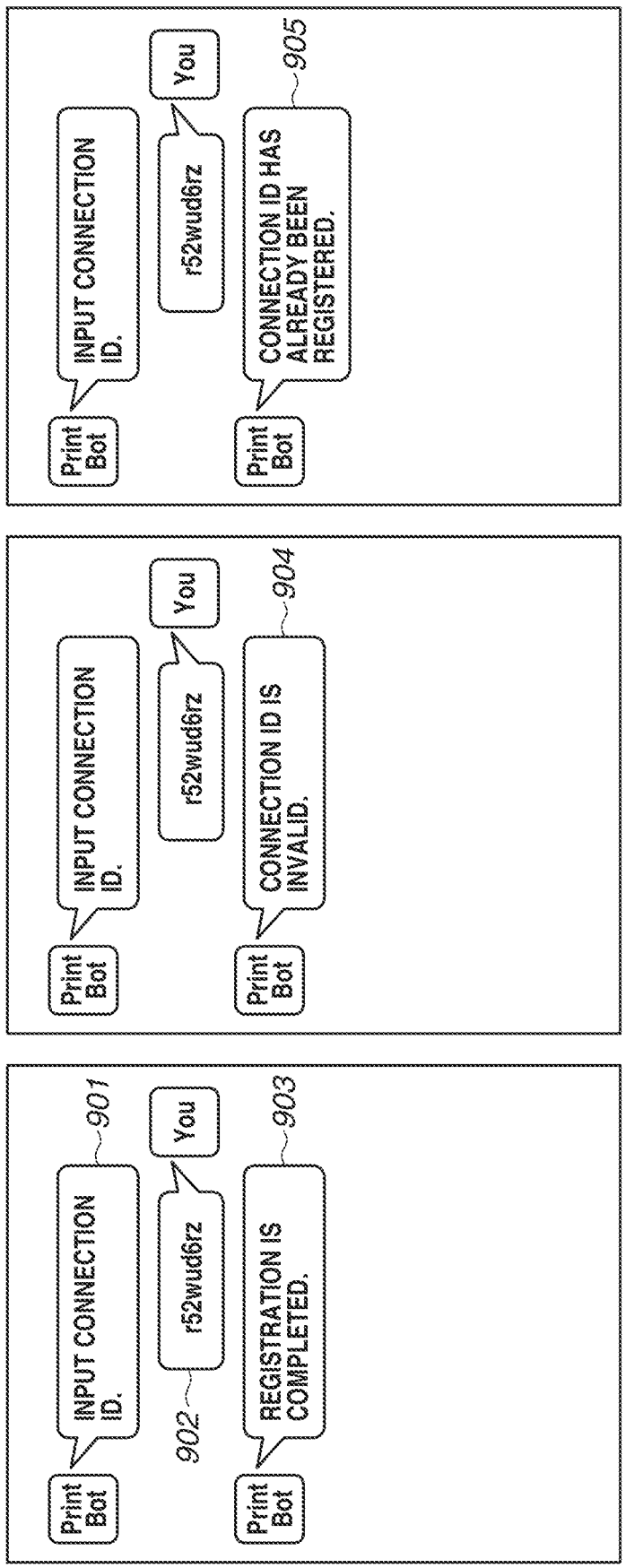

FIG.10A

| CLIENT USER NAME | IDENTIFICATION INFORMATION | PRINTER ID | MODEL NAME |
|---|---|---|---|
| A | C0001 | 03679 | P0002 |
| B | C0673 | 35126 | P0001 |
|  |  |  |  |

FIG.10B

| APPLICATION ID | PRINTER ID |
|---|---|
| BOT0001 | 03679 |
| BOT0001 | 35126 |
|  |  |
|  |  |

SYSTEM AND STORAGE MEDIUM

BACKGROUND

Field

The present disclosure relates to a system and a storage medium.

Description of the Related Art

A technique for connecting apparatuses at a plurality of locations to hold a conference therebetween is discussed in Japanese Patent Application Laid-Open No. 2018-207337.

However, Japanese Patent Application Laid-Open No. 2018-207337 does not discuss processing to be performed when printing is required.

SUMMARY

According to an aspect of the present disclosure, a system includes a client terminal including at least one processor causing the client terminal to act as a display controller configured to display a message transmitted from a user different from a user of the client terminal and a transmission unit configured to transmit a print request message including user identification information of the user different from the user of the client terminal and a file to be printed, and a server including at least one processor causing the client terminal to act as a request unit configured to perform print request processing for printing the file to be printed by using a printing apparatus corresponding to the user identification information included in the print request message.

Further features of the present disclosure will become apparent from the following description of exemplary embodiments with reference to the attached drawings.

BRIEF DESCRIPTION OF THE DRAWINGS

FIG. 6 illustrates a connection ID management table.

FIGS. 7A and 7B illustrate example screens of connection ID issuance processing.

FIGS. 9A, 9B, and 9C illustrate example screens of the registration processing.

FIGS. 10A and 10B illustrate registered printer management tables.

DESCRIPTION OF THE EMBODIMENTS

Exemplary embodiments of the present disclosure will be described in detail below with reference to the accompanying drawings. The following exemplary embodiments do not limit the present disclosure to the scope of the appended claims. Not all of the combinations of the features described in the present exemplary embodiment are indispensable to the method of solving the problem in the present disclosure.

A first exemplary embodiment will be described below centering on a system in which a web print service, a web conference system, and a bot application cooperates with each other. For example, in this system, the user transmits a file and issues a printing execution instruction via a messaging service application.

[System Configuration]

The configurations of servers and apparatuses in the system according to the first exemplary embodiment will be described below.

Figure 1:
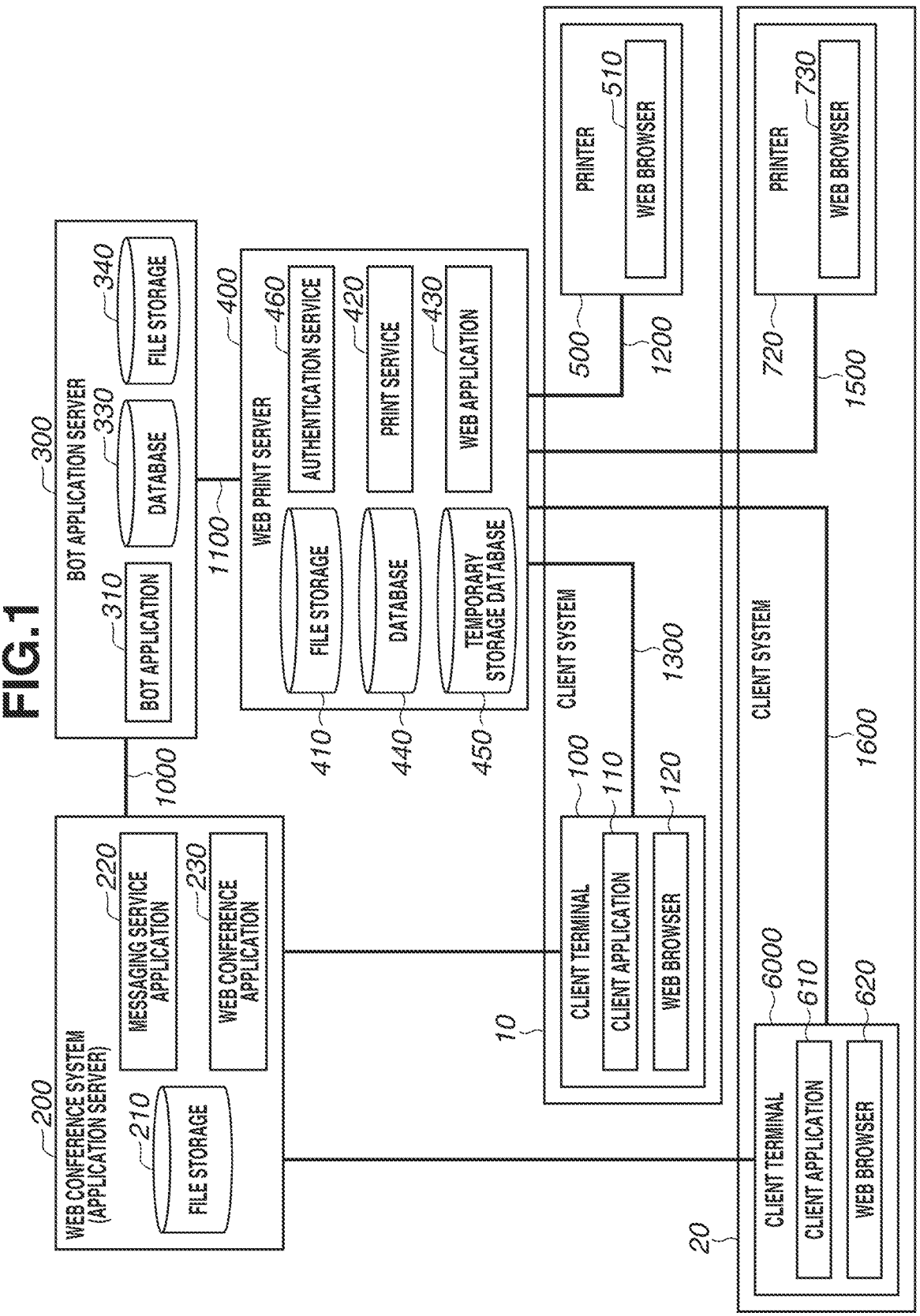
FIG. 1 illustrates an example configuration of a web printing system.

FIG. 1 illustrates an example configuration of a client-server network system according to the present exemplary embodiment. The network system according to the present exemplary embodiment includes a client system 10 including a client terminal 100 and a printer 500, and a client system 20 including a client terminal 6000 and a printer 720. The network system further includes a web conference system 200, a bot application server 300, and a web print server 400. Referring to FIG. 1, the web conference system 200 is connected with each of the client terminal 100 and the bot application server 300 via networks 1000.

The bot application server 300 and the web print server 400 are communicably connected with each other via a network 1100. The client terminal 100 and the web print server 400 are communicably connected with each other via a network 1300. The web print server 400 and the printer 500 are communicably connected with each other via a network 1200. Although, in FIG. 1, the client systems 10 and 20 are provided, the number of client systems is not limited to the example illustrated in FIG. 1, and three or more client systems may be provided. Each server may be a server system including a plurality of servers such that the load can be distributed thereto. The web conference system 200 may also be a server system including one server or a plurality of servers.

The networks 1000 to 1600 may be, for example, either one of a local area network (LAN) such as the Internet, a wide area network (WAN), a telephone line, a dedicated digital line, automatic teller machine (ATM), a frame relay line, a cable television line, and a wireless line for data broadcasting. The networks 1000 to 1600 may be wired or wireless as long as data transmission and reception are possible thereby, such as wireless communication networks implemented by a combination of the foregoing communication lines. The networks 1000 to 1600 may be different networks or the same network.

The configuration of a client system will be described below using the client system 10 as an example. Examples of the client terminals 100 include an information processing apparatus, such as a personal computer (PC), a smart phone, and a tablet terminal. The client terminal 100 includes a client application 110 and a web browser 120. The client application 110 transmits a message and a file (image data) including character strings input by a user operation to a messaging service application 220 of the web conference system 200 via the network 1000. The client application 110 notifies the user of a message received from the messaging service application 220 via the network 1000. Although the message is basically notified to the user by being displayed on the screen of the client application 110, the message may be notified by voice. The client application 110 is also used when the user participates in a web conference on the web conference system 200.

The web browser 120 is an application for displaying a web page. The web browser 120 displays a web page that is provided by a web application 430 included in the web print server 400 via the network 1300. The web browser 120 receives an operation from the user using the client terminal 100. Web pages to be displayed by the web browser 120 are not limited the ones provided by the web application 430 of the web print server 400. For example, screens related to the web conference system 200 may be displayed on the web browser 120. Although the present exemplary embodiment assumes a Hypertext Markup Language (HTML) as a web page description language, the language is not particularly limited thereto. The client system 20 has a similar configuration to that of the client system 10.

The web conference system 200 includes a file storage 210, the messaging service application 220, and a web conference application 230. The file storage 210 stores files transmitted from the client application 110 of the client terminal 100. The web conference system 200 is a web service on the Internet, which provides a web conference service. To connect to the web conference system 200 to hold a web conference, it is necessary that the client application 110 compatible with the web conference system 200 is installed in the client terminal 100 of each participant. Each participant of the web conference can participate in the web conference by installing the client application 110 in the client terminal 100 and executing the client application 110. The messaging service application 220 receives messages and files transmitted from the client application 110 of the client terminal 100. Then, the messaging service application 220 transmits a message reception event to the bot application 310 of the bot application server 300 via the network 1000. Upon reception of the reception event, for example, the bot application 310 issues a file acquisition request in step S1103 (described below). The messaging service application 220 stores a received file in the file storage 210. The messaging service application 220 transmits a message to the client application 110 based on a request from the bot application 310. The messaging service application 220 also transmits a file stored in the file storage 210 to the bot application 310. Although not illustrated in FIG. 1, the web conference system 200 performs message relay processing when messages are exchanged between a plurality of the client terminals 100. For example, a message transmitted from the client application 110 is transmitted to the client application 610 via the messaging service application 220.

The bot application server 300 includes a bot application 310, a database 330, and a file storage 340. The bot application 310 receives an event notification from the messaging service application 220 of the web conference system 200 and then performs processing according to the content of the received event. The bot application 310 transmits a message transmission request to the messaging service application 220 via the network 1000 as necessary. The bot application 310 is handled as a virtual user of the messaging service application 220 or a virtual participant of the web conference by the web conference system 200. The bot application 310 can perform message transmission and reception with the client applications 110 and 610 of the connected client terminals 100 and 6000, respectively. The bot application 310 may automatically generate and transmit a message in response to each message transmitted from the client applications 110 and 610. For example, when a message "hello" is transmitted from the client application 110 to the bot application 310, the bot application 310 may transmit a message "hello" as a response.

Information about owned printers for each user is stored in the database 330. The file storage 340 stores files subjected to printing by the printers 500 and 720.

The web print server 400 provides a print service. The print service in the present exemplary embodiment refers to a service for transmitting a print and scan instruction received from the outside to a registered printer (e.g., the printers 500 and 720) via the network 1200 to instruct the printer to perform printing and scanning. The web print server 400 includes a file storage 410, a print service 420, the web application 430, a database 440, a temporary storage database 450, and an authentication service 460.

The authentication service 460 is a service for authenticating an access source based on registered account information upon reception of access from the client terminal 100 or 6000 or the printer 500 or 720. The use of the print service is permitted only when the authentication by the authentication service 460 is successful. According to the present exemplary embodiment, the account information includes at least a user identifier (ID) and a password. The user of the client application 110 is assumed to have preregistered information about the owned (usable) printer 500 in advance. Although, in the present exemplary embodiment, the user owns one printer, the user may own a plurality of printers.

The database 440 stores account information that has been registered in the print service, information about a printer associated with the account information, and information about an application that uses the print service. Although, in the present exemplary embodiment, only the bot application server 300 uses the print service, the present disclosure is not limited thereto. Other applications may use the print service. The print service 420 receives a print request from the bot application 310 of the bot application server 300, generates a print job, and notifies the printer 500 of the print job. The file storage 410 stores a print job that has been converted into a format processable by the printer 500.

The web application 430 has a function of providing the web browser 120 or 620 of the client terminal 100 or 6000 or the web browser 510 or 730 of the printer 500 or 720 with a web page to issue and display a connection ID through a user operation. The web application 430 also has a function of receiving the connection ID input by the user by using the client application 110 or 610 via a network to verify whether the connection ID is valid. The connection ID will be described in detail below. The temporary storage database 450 is used to temporarily store the connection ID issued by the web application 430.

The printers 500 and 720 will be described below by taking the printer 500 as an example. The printer 720 has a similar configuration to that of the printer 500.

The printer 500 includes the web browser 510. The printer 500 receives a print job notification from the print service 420 of the web print server 400. The printer 500 accesses the file storage 410 of the web print server 400 according to the content of the print job notification, acquires a print job, and performs printing. The web browser 510 is an application for displaying a web page. The web browser 510 displays the web page provided by the web application 320 of the bot application server 300, and receives a user operation of a user that uses the client terminal 100 or 6000.

Figure 2:
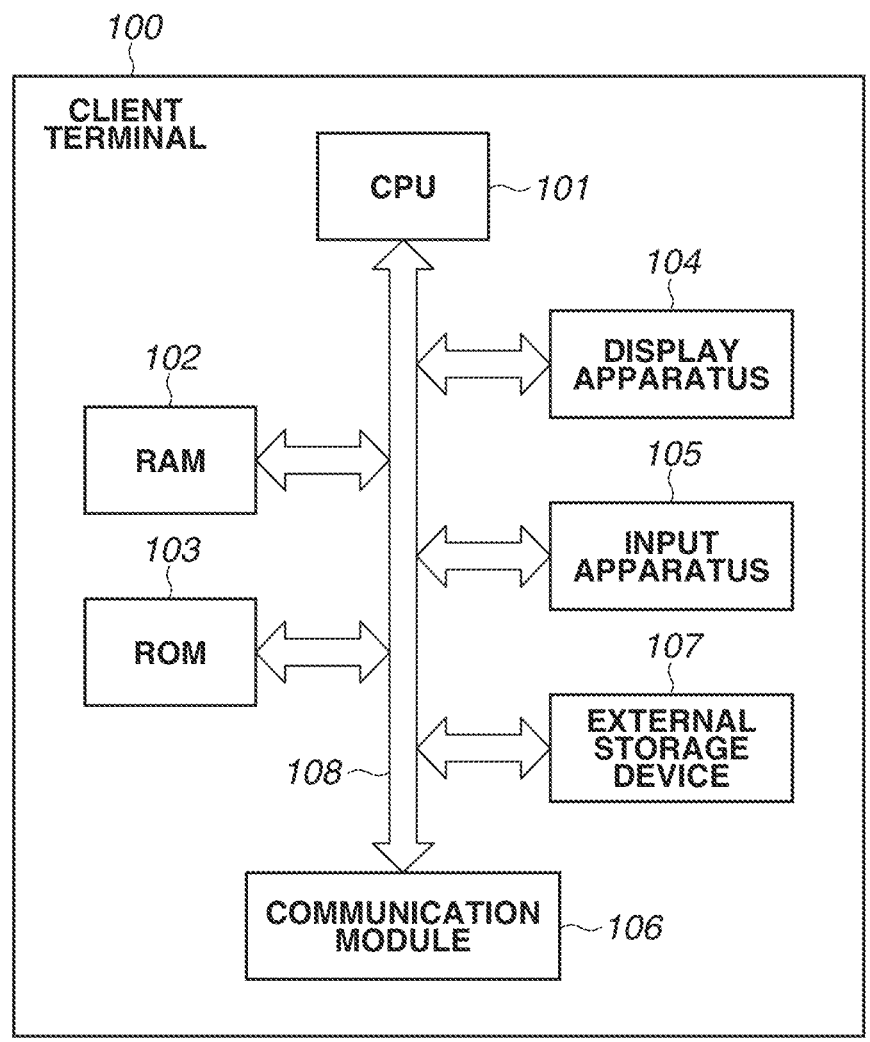
FIG. 2 illustrates an example configuration of a client terminal.

FIG. 2 illustrates an example hardware configuration of the client terminals 100 and 6000 according to the present exemplary embodiment. Since the client terminals 100 and 6000 have the same configuration, a description will be given below taking the configuration of the client terminal 100 as an example. The client terminal 100 includes a central processing unit (CPU) 101, a random access memory (RAM) 102, a read only memory (ROM) 103, a display apparatus 104, an input apparatus 105, a communication module 106, and an external storage device 107.

The CPU 101 performs calculation, determination, and control of data and instructions according to programs stored in the RAM 102 and the ROM 103. The RAM 102 is a volatile memory and is used as a temporary storage area when the CPU 101 performs various processing. The ROM 103 is a nonvolatile memory and records an operating system (OS), the client application 110, the web browser 120, and other application software. The display apparatus 104 includes a liquid crystal display and a graphic controller, and displays web pages downloaded from each server and graphical user interfaces (GUIs). Web page display is implemented when the web browser 120 downloads a web page into the RAM 102 and then displays the web page on the display apparatus 104. More specifically, processing performed by the client terminal 100 is implemented when the CPU 101 reads a program stored in the ROM 103 and then executes the program.

The input apparatus 105 is operated by the user to issue various instructions to the client terminal 100. A keyboard is an example of the input apparatus 105. The input apparatus 105 is used to capture an image. A camera is an example of the input apparatus 105. The input apparatus 105 is not limited thereto but may be an external device. The client terminal 100 inputs various instructions given by the user via the input apparatus 105 and performs various control according to the instructions.

The communication module 106 is an interface for communicating with an external apparatus connected, for example, with a LAN cable or a telephone line. The communication module 106 connects with a communication apparatus (not illustrated) such as a router, and performs data communication with the web conference system 200 and the bot application server 300 via the network 1000. This data communication may be, for example, wirelessly performed via an interface supporting wireless communication. The external storage device 107 is a nonvolatile storage area. For example, if the client terminal 100 is a smart phone, a flash memory is typically used as the external storage device 107. A system bus 108 is used for data exchange in the client terminal 100.

The client terminal 100 illustrated in FIG. 2 includes the display apparatus 104 and the input apparatus 105 as separate apparatuses. However, the present exemplary embodiment is not limited thereto. The client terminal 100 may include a touch-panel display into which the display apparatus 104 and the input apparatus 105 are integrated. In this case, a camera as an imaging apparatus is provided separately from the touch-panel display. Although FIG. 1 illustrates one client terminal 100, the client application according to the present exemplary embodiment enables message transmission and reception between a plurality of client terminals. In this case, the plurality of client terminals may have the same hardware configuration or different hardware configurations.

Figure 3:
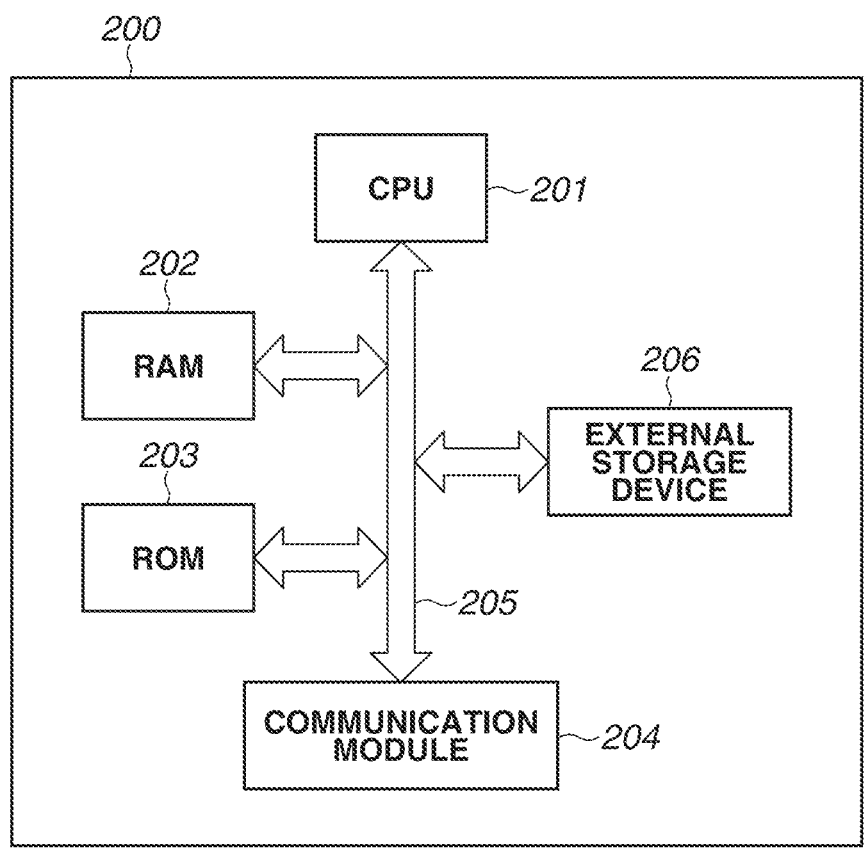
FIG. 3 illustrates an example configuration of an application server.

FIG. 3 illustrates an example of a hardware configuration of the web conference system 200 according to the present exemplary embodiment. The web conference system 200 includes a CPU 201, a RAM 202, a ROM 203, a communication module 204, and an external memory 206. Although processing performed by the web conference system 200 according to the present exemplary embodiment is assumed to be performed by one server, the processing may be performed by a plurality of servers in a collaborative way.

The CPU 201 performs calculation, determination, and control of data and instructions according to programs stored in the RAM 202 and the ROM 203. The RAM 202 is a volatile memory and is used as a temporary storage area when the CPU 101 performs various processing. The ROM 203 is a nonvolatile storage area. The communication module 204 is an interface for communicating with an external apparatus connected with a LAN cable, for example. The communication module 204 connects with a communication apparatus (not illustrated) such as a router, and performs data communication with the client terminal 100 and the bot application server 300 via the network 1000. This data communication may be, for example, wirelessly performed via an interface supporting wireless communication. The external memory 206 records an operating system (OS) and other various data such as applications. A system bus 205 is used for data exchange in the web conference system 200. More specifically, processing performed by the web conference system 200 is implemented when the CPU 201 reads a program stored in the ROM 203 and then executes the program.

The hardware configurations of the bot application server 300 and the web print server 400 are similar to the above-described configuration of the web conference system 200, so that detailed descriptions thereof will be omitted. The hardware configuration of each server is not limited to the above-described configuration. For example, each server may have the configuration of a typical information processing apparatus, or a different configuration.

Figure 4:
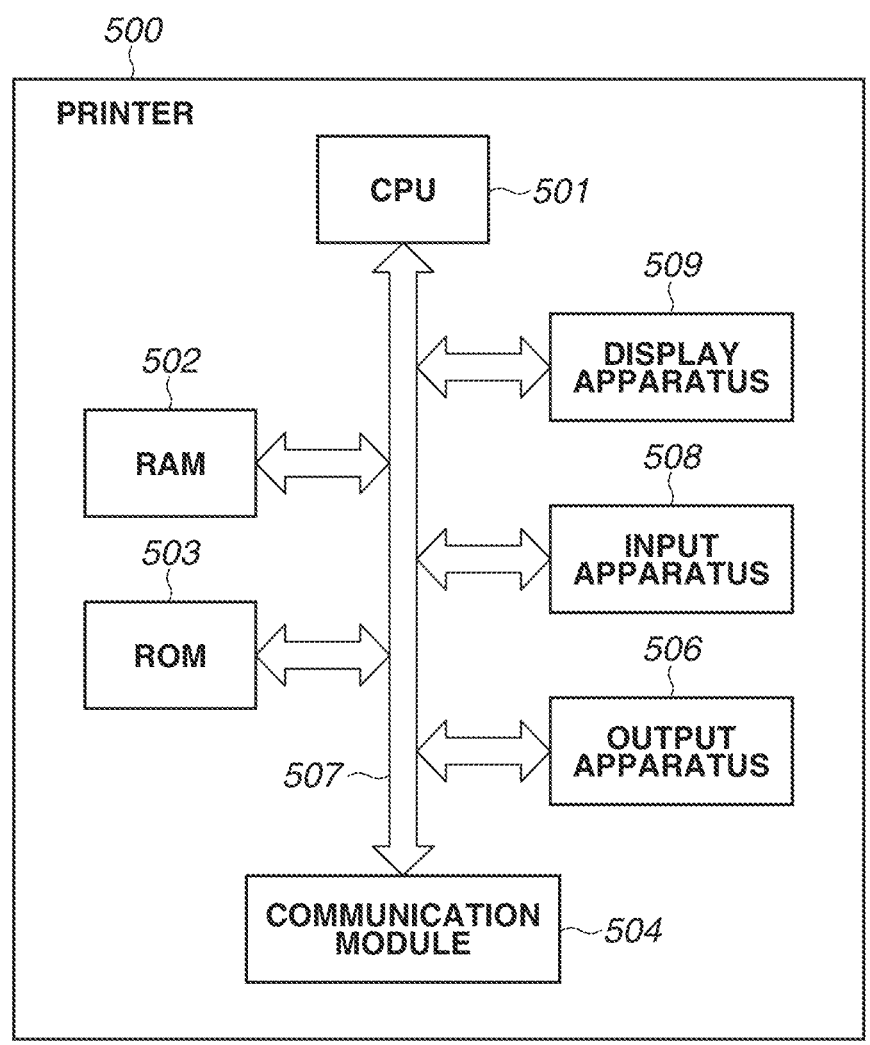
FIG. 4 illustrates an example configuration of a printer.

FIG. 4 illustrates an example hardware configuration of the printers 500 and 720 according to the present exemplary embodiment. Since the printers 500 and 720 have the same configuration, a description will be given below taking the configuration of the printer 500 as an example. The printer 500 includes a CPU 501, a RAM 502, a ROM 503, a communication module 504, an output apparatus 506, an input apparatus 508, and a display apparatus 509.

The CPU 501 performs calculation, determination, and control on data and instructions according to programs stored in the RAM 502 and the ROM 503. The RAM 502 is a volatile memory and is used as a temporary storage area when the CPU 101 performs various processing. The ROM 503 is a nonvolatile memory and records an operating system (OS), the web browser 510, and other application software. The ROM 503 may be a data rewritable nonvolatile memory of which the typical example is a flash memory. The communication module 504 is an interface for communicating with, for example, an external apparatus connected with a LAN cable. The communication module 504 connects with a communication apparatus (not illustrated) such as a router, and performs data communication with the web print server 400 via the network 1200. This data communication may be wirelessly performed, for example, via an interface supporting wireless communication. More specifically, processing performed by the printer 500 is implemented when the CPU 501 reads a program stored in the ROM 503 and then executes the program.

The output apparatus 506 is used to form an image on a print sheet (recording medium) such as paper. A printing unit is an example of the output apparatus 506. The input apparatus 508 is a panel operated by the user to issue various instructions to the printer 500, e.g., hardware keys. The display apparatus 509 displays graphical user interfaces (GUIs). The display apparatus 509 may include a full color liquid crystal display or a small number of light emitting diodes (LEDs). A touch panel display into which the input apparatus 508 and the display apparatus 509 are integrated is also applicable. A system bus 507 is used for data exchange between the units included in the printer 500.

As described above, the printer 500 according to the present exemplary embodiment is assumed to be a network printer capable of communicating with an external apparatus via a network. The printer 500 according to the present exemplary embodiment is not limited to the above-described configuration and may further include a unit corresponding to the function. For example, a Multi-Function Peripheral (MFP) may be used as the printer 500. The system may include a plurality of printers having different functions.

[Processing Sequence]
(Processing for Issuing Connection ID)

Figure 5:
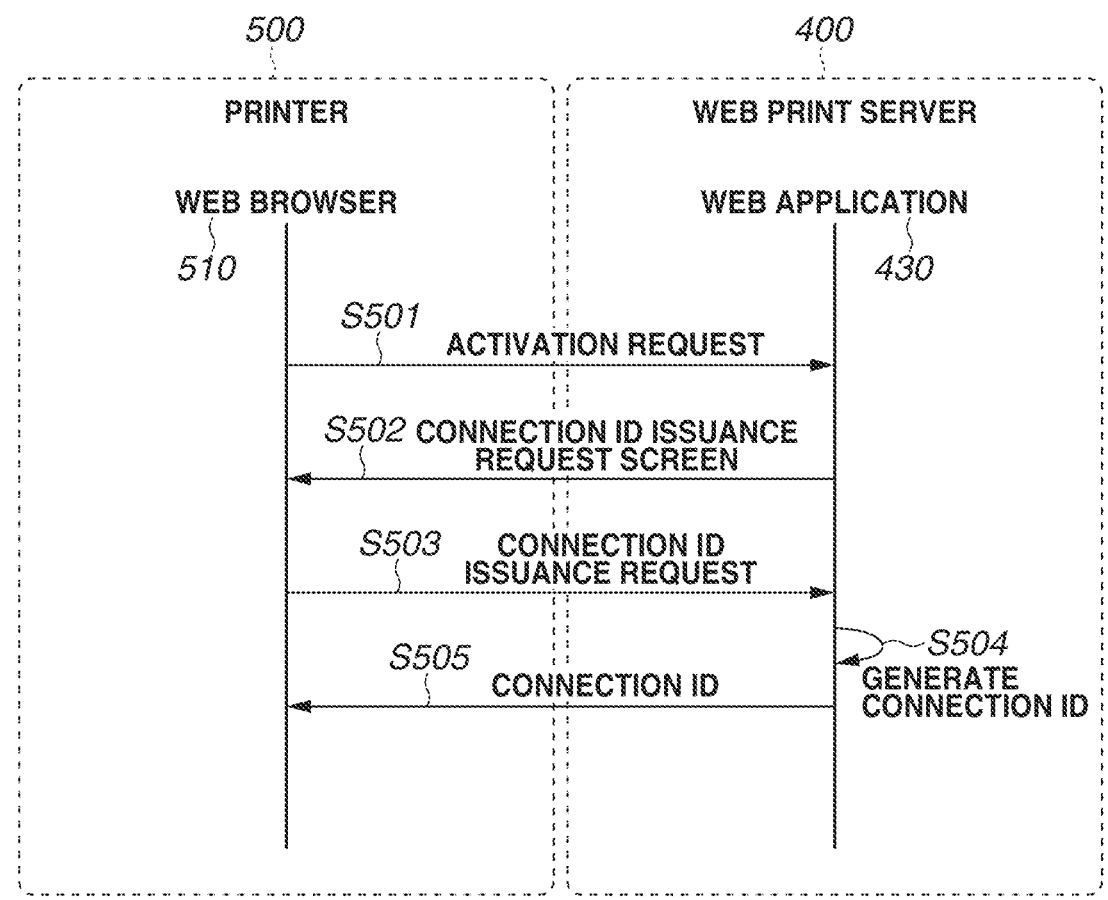
FIG. 5 is a sequence diagram illustrating connection identifier (ID) issuance processing.

FIG. 5 is a sequence diagram illustrating processing for issuing a connection ID of a printer according to the present exemplary embodiment. FIGS. 7A and 7B illustrate example screens of the web application 430 related to the processing for issuing a connection ID. This processing sequence is the same for both of the printers 500 and 720. The processing for issuing a connection ID of the printer 500 will be described below as an example.

In step S501, upon reception of an activation instruction by a user operation to issue a connection ID, the web browser 510 of the printer 500 transmits an activation request to the web application 430 of the web print server 400.

In step S502, as a response to the activation request, the web application 430 returns a connection ID issuance request screen 701 illustrated in FIG. 7A.

The web browser 510 displays the connection ID issuance request screen 701 based on the response in step S502. In step S503, upon reception of an issuance instruction by a user operation via an issuance request button 702 of the connection ID issuance request screen 701, the web browser 510 transmits a connection ID issuance request to the web application 430. The connection ID issuance request includes the printer ID, i.e., a unique identifier (identification information), of the printer 500 and printer model information about the printer 500 in the print service.

In step S504, upon reception of the connection ID issuance request, the web application 430 searches for the printer ID included in the request in the database 440 and determines whether the printer ID has been registered. When the printer ID has not been registered, the web application 430 issues a random value with a fixed number of digits as the connection ID. The user may register the printer ID in the web print server 400 before requesting the connection ID. The connection ID is used as authentication information for printer registration. The web application 430 records the issued connection ID, printer ID, printer information acquired from the database 440 by using the printer ID as a key, and the expiration date and time of the connection ID, in the temporary storage database 450. Although, in this example, a 9-digit random value is generated as the connection ID, the number of digits is not limited to 9. In addition, the method for generating a random value is not limited. The expiration date and time of the connection ID may be a predetermined value, and a period from a predetermined timing may be used instead of the expiration date and time.

FIG. 6 illustrates an example configuration of a connection ID management table 600 managed by the temporary storage database 450 according to the present exemplary embodiment. The connection ID management table 600 is managed in association with the connection ID, printer ID, printer model, and expiration date and time. Referring to FIG. 6, two connection IDs, "amskri6ej" and "abdbdc612", are managed for the same printer ID "05001". This is because connection ID issuance was performed twice for one printer. For example, when the user operates the printer 500 to request for a connection ID corresponding to the bot application 310, the connection ID is issued for the bot application 310 (i.e., for the bot application server 300). Then, when the user operates the printer 500 to request for a connection ID for another bot application, another connection ID is issued for the other bot application (i.e., for the other bot application server 300). As a result, two different connection IDs have been issued for the same printer. To cope with such processing, application IDs (for example, BOT0001 and BOT0002) may be also managed in the connection ID management table 600 in FIG. 6 although these IDs are not included therein. According to the present exemplary embodiment, a different connection ID is issued even for the same user after the expiration date and time. If the same user issues a connection ID issuance request again before the expiration date and time, a different connection ID may be issued (updated). Further if the same user issues a connection ID issuance request again before the expiration date and time, only the expiration date and time may be updated.

In step S505, the web application 430 returns a connection ID display screen 710 of the web page including the connection ID generated in step S504 to the web browser 510 as a response to the connection ID issuance request. As illustrated in FIG. 7B, the connection ID display screen 710 is configured to display a connection ID 711 and information about an effective period 712. The connection ID display screen 710 may further include information about a printer.

(Registration Processing)

Figure 8:
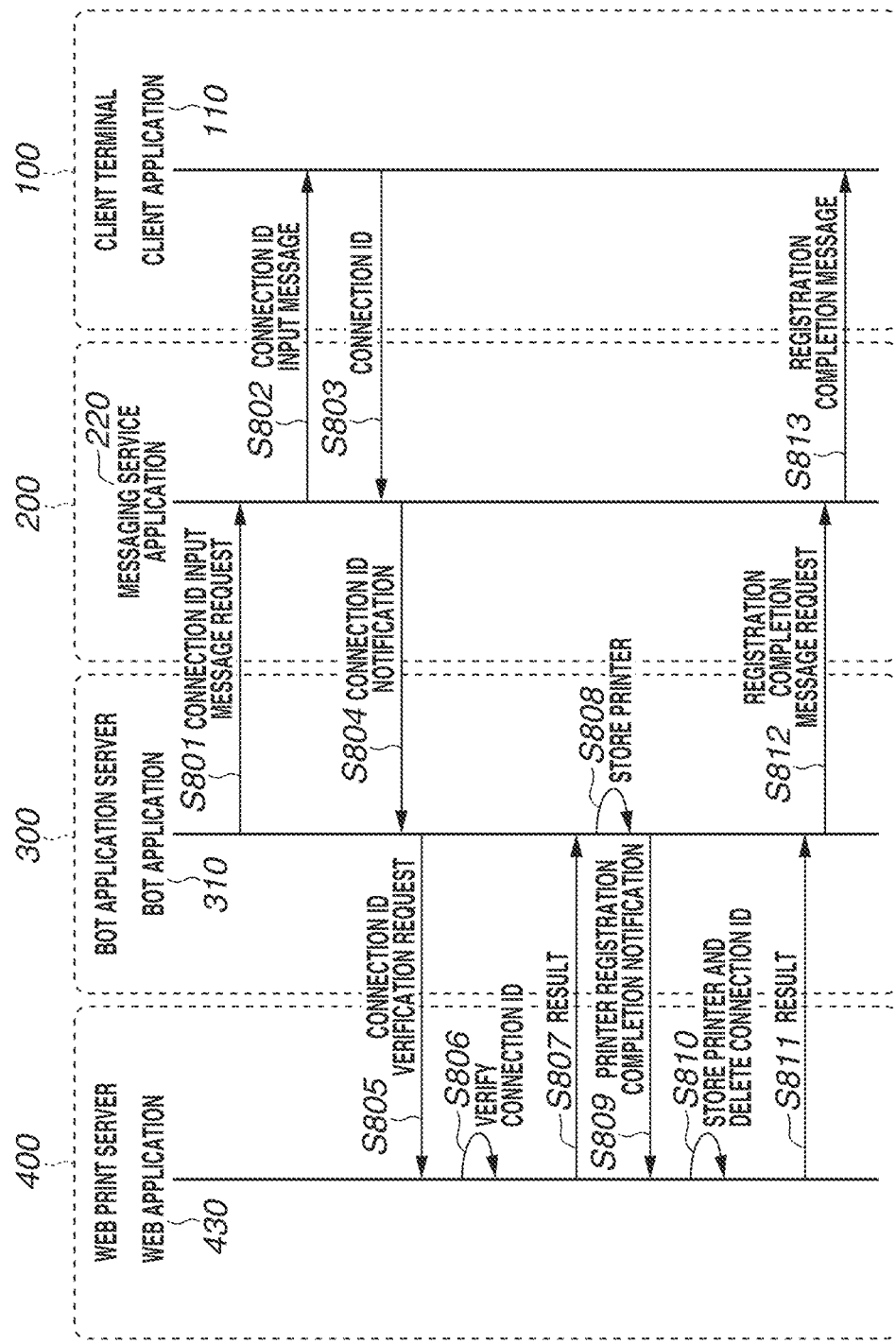
FIG. 8 is a sequence diagram illustrating registration processing.

FIG. 8 is a sequence diagram illustrating registration processing performed by the client system 10 (or client system 20) according to the present exemplary embodiment. Processing for registering the client application 110 and the printer 500 will be described below as an example. The sequence illustrated in FIG. 8 is started, for example, when the user issues a registration processing request from the client terminal 100. FIGS. 9A, 9B, and 9C illustrate examples of a message talk screen (a text message or chat screen) of the client application 110 related to the registration processing according to the present exemplary embodiment. In the message talk screen provided by the client application 110, messages and files transmitted from the user and a partner of the message talk are sequentially displayed from the top downward in time series. In the examples in FIGS. 9A, 9B, and 9C, dialog balloons on the left-hand side of the screen indicate messages and images transmitted from the partner of the talk, and dialog balloons on the right-hand side of the screen indicate messages and images transmitted from the user of the client application 110. In the examples in FIGS. 9A, 9B, and 9C, the partner of the talk is the bot application 310 as a virtual user that is identified as a "Print bot User". The icon on the left-hand side of the screen is displayed as "Print bot". When the user activates the client application 110 and then selects the "Print bot User" as a partner of the talk, a message exchange screen (screen in FIG. 9A, 9B, or 9C) is displayed. At this time, the messaging service application 220 transmits an event indicating that the talk screen has been displayed to the bot application 310. When this event is transmitted, the bot application 310 transmits a message including an option of whether to perform the registration processing to the client application 110 via the messaging service application 220. When the user selects the option of performing the registration processing by operating the client application 110, step S801 in FIG. 8 is started.

In step S801, the bot application 310 transmits a connection ID input message request to the messaging service application 220.

In step S802, the messaging service application 220 transmits a connection ID input message to the client application 110.

As illustrated in FIG. 9A, the user inputs the connection ID ("r52wud6rz") as a message 902 from the client application 110 on the client terminal 100. Then, after the connection ID is input, the user instructs transmission of the connection ID. Accordingly, in step S803, the client application 110 transmits the input connection ID to the messaging service application 220. In step S803, identification information for identifying the client application 110 and user identification information of the client application 110 are transmitted together with the connection ID.

In step S804, the messaging service application 220 transmits a notification including the connection ID received from the client application 110 and the identification information and the user identification information of the client application 110, i.e., the message transmission source, transmitted in step S803. The identification information of the client application 110 is unique to the client application 110. This identification information may be unique to the login user as long as the client application 110 is configured to prompt the user to perform login to use the client application 110.

In step S805, the bot application 310 issues a connection ID verification request for verifying the connection ID included in the notification received in step S804 to the web application 430. The connection ID verification request here includes at least the connection ID input in step S803 and the application ID assigned to the bot application 310 by the print service 420. In this example, an application ID "BOT0001" is assigned to the bot application 310.

In step S806, the web application 430 refers to the connection ID management table 600 stored in the temporary storage database 450 to verify the connection ID indicated by the connection ID verification request. More specifically, the web application 430 determines that the connection ID indicated by the connection ID verification request exists in the connection ID management table 600 and that the expiration date and time have not been reached. When these conditions are satisfied, the web application 430 determines that the connection ID is effective and valid. If the expiration date and time of the connection ID has been reached, the web application 430 deletes the connection ID in the connection ID management table 600. As described above, the table in FIG. 6 may further manage the application ID. Processing in step S806 in this case will be described below. The web application 430 may determine that application ID (e.g., BOT001) and the connection ID indicated by the verification request in step S805 exist in the same record of the connection ID management table 600 in FIG. 6 and the expiration date and time have not been reached.

In step S807, the web application 430 returns the result of the verification in step S806 to the bot application 310 as a response to the verification request. In a case where the connection ID is valid, the web application 430 returns the printer ID and the printer information, such as the printer model name, taken out from the temporary storage database 450 to the bot application 310, together with the verification result. On the other hand, in a case where the connection ID is invalid, the bot application 310 requests the client application 110 to stop the registration processing and transmit a registration error message via the messaging service application 220. In this case, as illustrated in FIG. 9B, the client application 110 displays a registration error message 904.

In step S808, the bot application 310 receives a notification with the result returned in step S807 indicating that the connection ID is valid. Upon reception of this notification, the bot application 310 stores, in the database 330, the received printer ID and printer information (model name), the identification information and the user identification information of the client application 110 received in step S804 in an associated way. An example of a management table provided in the database 330 will be described below with reference to FIG. 10A. In this example, when a set of the identification information and the printer ID of the same client application 110 has already been registered in the management table, the bot application 310 transmits a registration completion message to the client application 110 via the messaging service application 220. In this case, the client application 110 displays a registration completion message 905 in the talk screen, as illustrated in FIG. 9C.

In step S809, the bot application 310 transmits a printer registration completion notification to the web application 430. This notification includes at least the connection ID and the application ID of the bot application 310.

In step S810, upon reception of the printer registration completion notification, the web application 430 stores the printer ID and the application ID of the bot application 310 in the database 440. More specifically, the web application 430 acquires the printer ID corresponding to the connection ID included in the printer registration completion notification transmitted in step S809 from the connection ID management table 600 in FIG. 6. Then, the web application 430 stores the printer ID acquired from the connection ID management table 600 and the application ID of the bot application 310 included in the printer registration completion notification in the database 440 (FIG. 10B). The configuration of the management table provided in the database 440 here will be described below with reference to FIG. 10B. Further, the web application 430 deletes the connection ID from the connection ID management table 600 of the temporary storage database 450.

In step S811, the web application 430 notifies the bot application 310 of the registration result.

In step S812, upon reception of the registration result, the bot application 310 transmits a registration completion message request to the messaging service application 220.

In step S813, upon reception of the registration completion message request, the messaging service application 220 transmits a registration completion message to the client application 110. Upon reception of the registration completion message, the client application 110 displays a registration completion message 903 in the talk screen, as illustrated in FIG. 9A. Then, this sequence is ended.

FIGS. 10A and 10B illustrate examples of management tables according to the present exemplary embodiment. The user name of the client application 110, the identification information of the client application 110, the printer ID, and the model name are stored in a management table 1001 in an associated way. The management table 1001 is stored in the database 330 of the bot application server 300. For example, the management table 1001 is updated in step S808 in FIG. 8. In step S808, if the identification information of the client application 110 exists in the management table 1001, the record corresponding to the identification information may be deleted from the management table 1001 and the registration processing is continued or canceled. The duplication of the user identification information may be permitted and registration of a plurality of printers may be allowed.

The application ID and the printer ID are stored in the management table 1002 in an associated way. The management table 1002 is stored in the database 440 of the web print server 400 in step S810 in FIG. 8. When the user performs registration processing for another bot application different from the BOT application 310 and the printer 500, basically processing similar to the processing in FIG. 8 is performed. Thus, when the user performs the processing in FIG. 8 for another BOT application, for example, an application ID (e.g., BOT0002) corresponding to the other BOT application and an input printer ID are managed in the table in FIG. 10B.

According to the above-described procedure, the user of the client system 10 or 20 registers the printer 500 or 720 based on his/her own user account of the client application 110 or 610. In the exemplary embodiment, as a result of the user operation, the information about the printer 500 is stored in association with a client user name A, and the information about the printer 720 is stored in association with a client user name B, as described in the management table 1001.

Figure 12:
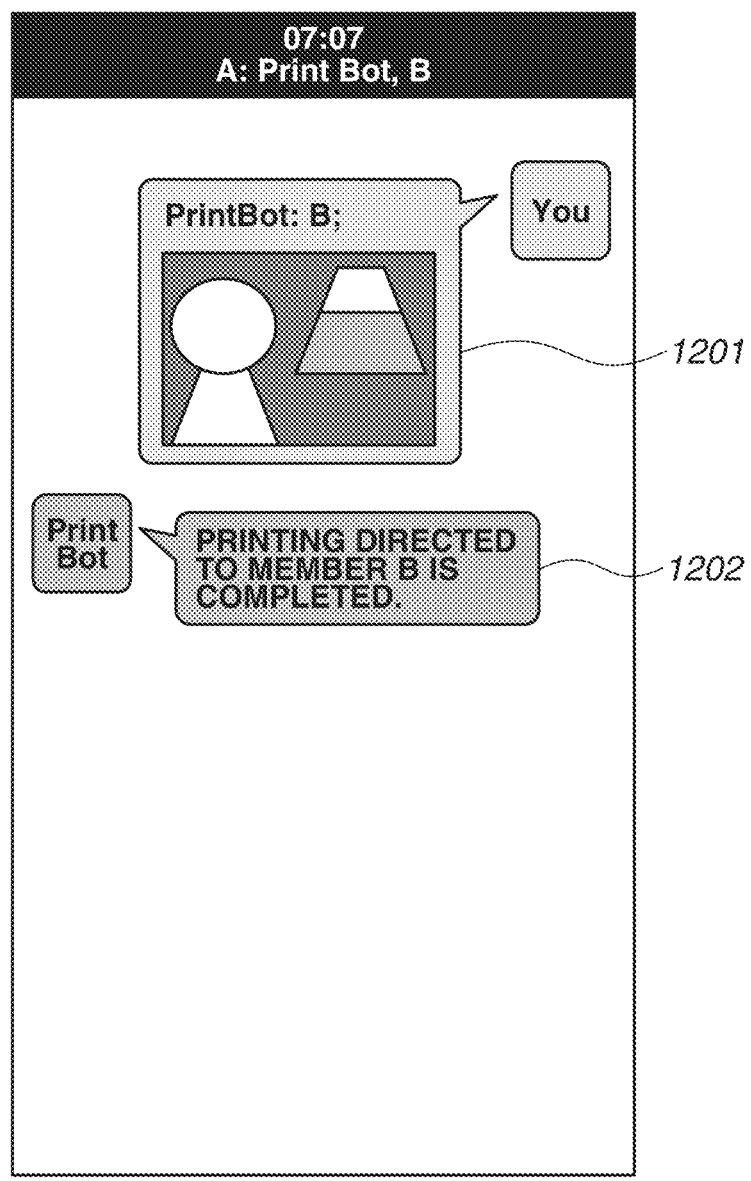
FIG. 12 illustrates an example of a message talk screen in the print processing.
Figure 15:
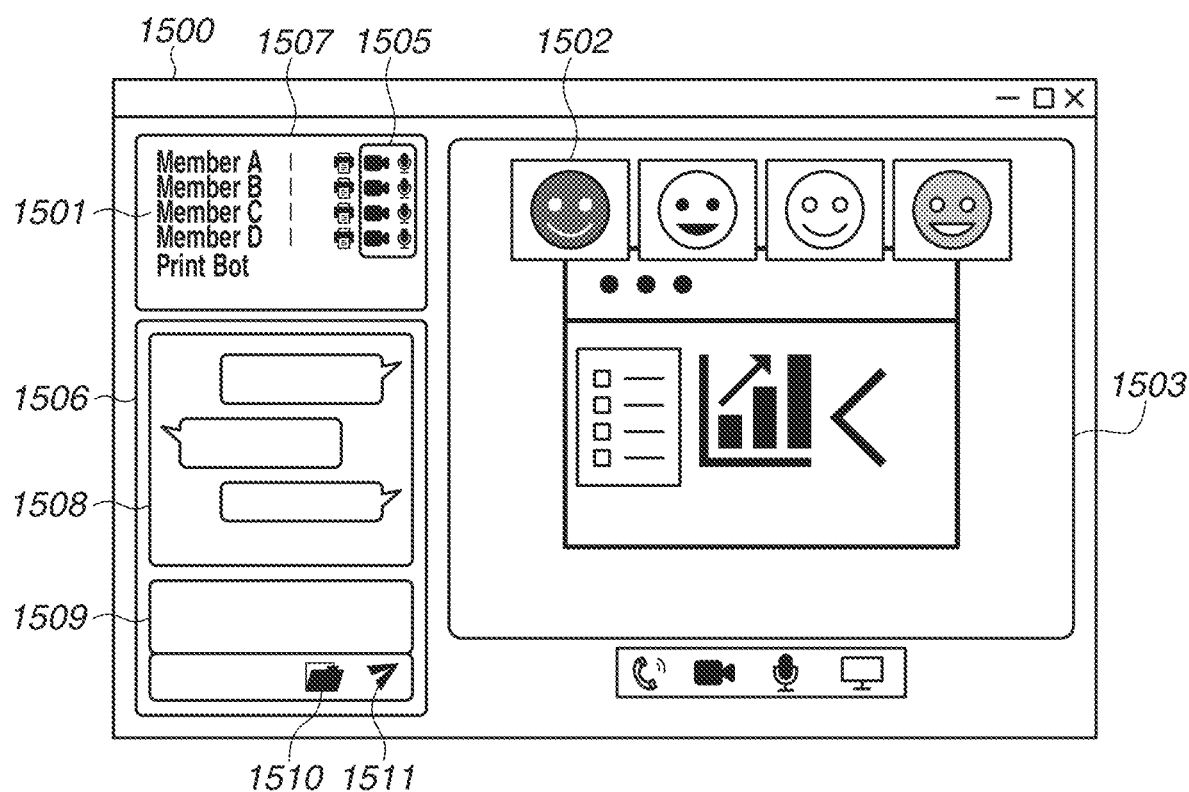
FIG. 15 illustrates an example screen of a web conference system.

An example screen of the client application 110 (or 610) according to the present exemplary embodiment will be described below with reference to FIG. 15. A screen 1500 in FIG. 15 is provided by the web conference application 230. A region 1501 includes the names of members participating in the web conference and icons indicating the respective device conditions of the members. A region 1502 is a display portion for displaying the video images of the members participating in the web conference. The image of each member is displayed in the region 1502 through the camera connected to the client terminal of each member. A region 1503 displays the screen of the client terminal of the member given a display privilege among the members participating in the web conference. To perform presentation, a presenter acquires a display privilege, displays a file to be presented on the screen of the client terminal of the presenter, and distributes the screen. As a result, each participant of the web conference can check the screen of the presenter on the client terminal of the participant. A region 1506 is used to transmit and receive text messages and files between the participants of the web conference. Printer icons 1507 indicate the statuses of printers of the participants of the web conference. Icons 1505 indicate the statuses of the cameras and microphones of the participants of the web conference. The user turns the function of the apparatus corresponding to each icon ON or OFF by operating each icon. According to the present exemplary embodiment, a file to be printed can be transmitted by using a talk screen 1508 for message transmission and reception (described below). When the user wants to select a file to be printed, the user selects an icon 1510. A file list is displayed allowing the user to select a file to be printed. For example, the user specifies the Print bot and another user (for example, member B) to which the user wants to give a print instruction in the region 1501 and then selects the icon 1510. A file list screen is displayed. When the user selects a file to be printed from the file list screen, "Print bot:B;" and a preview screen of the selected file are displayed in a message input region 1509. In this state, when the user operates an icon 1511, a print request message 1201 of FIG. 12 is transmitted and the file to be printed is printed by the printer of the specified user B. More specifically, the client application 110 generates the print request message 1201 including the user identification information corresponding to the participant information selected from a participant information list in the region 1501 and then transmits the message 1201. The print request message 1201 includes the user identification information "B" about the user B different from the user A of the client terminal 100 and the file to be printed.

(Print Processing)

Figure 11:
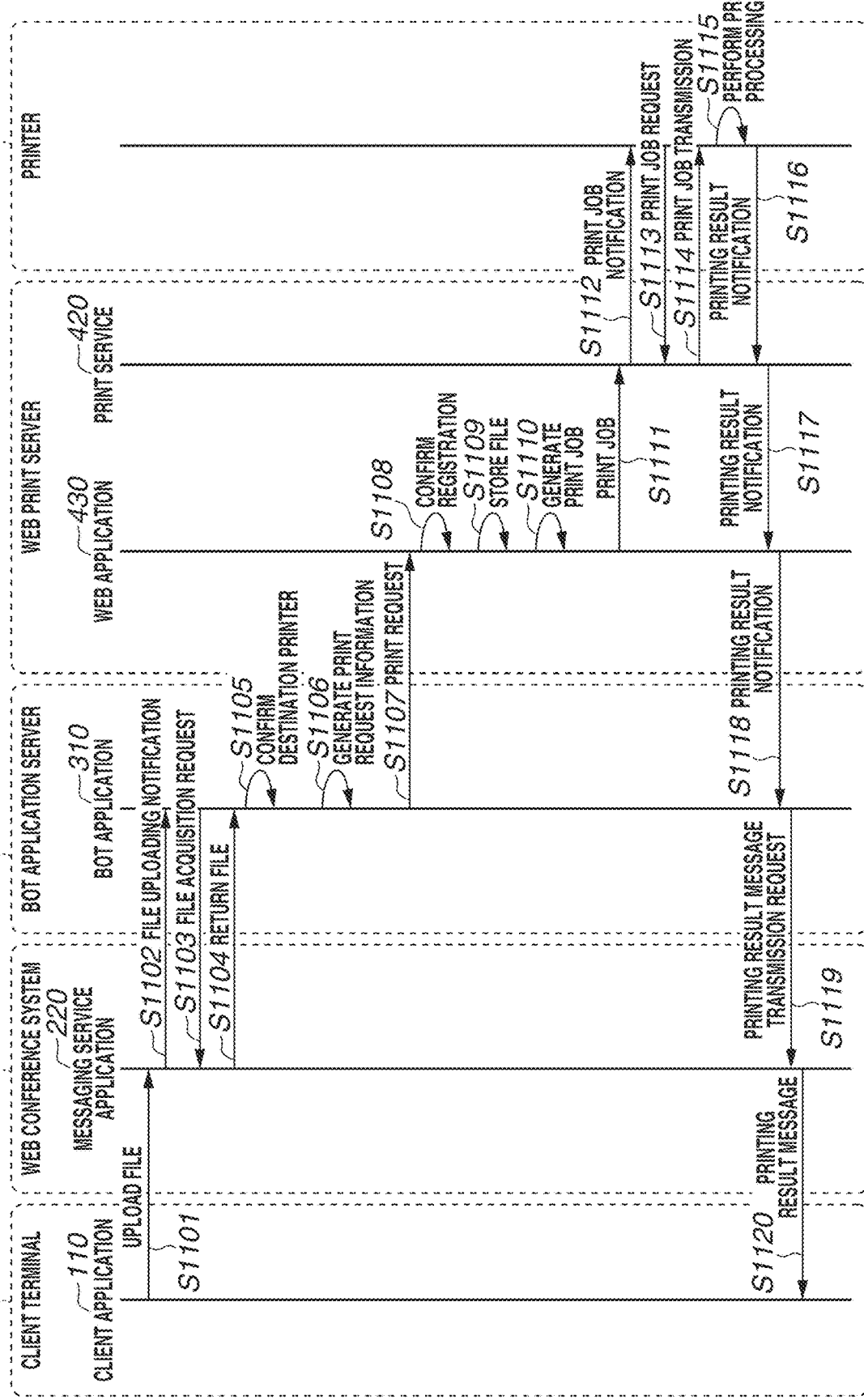
FIG. 11 is a sequence diagram illustrating print processing.

FIG. 11 is a sequence diagram illustrating processing in which a file transmitted from the client application 110 by the user A participating in the web conference is printed by the printer 720 of the user B participating in the same web conference. FIG. 12 illustrates an example of a talk screen of the client application 110 in the processing in which the file transmitted from the client application 110 by the user A is printed by the printer 720 according to the present exemplary embodiment. The talk screen illustrated in FIG. 12 corresponds to the above-described talk screen 1508. The CPU 101 of the client terminal 100 performs display control processing for displaying a screen as illustrated in FIG. 12.

First, the user operates the input apparatus 105 of the client terminal 100 to perform operation to upload print destination user information and a file to be printed as a message directed to "Print bot" from the client application 110. This operation method has been described above with reference to FIG. 15, so that the redundant description thereof will be omitted here. This operation displays the print request message 1201 including the user name "B" of the print destination user and the file to be printed as a message directed to "Print bot" on the talk screen, as illustrated in FIG. 12. In step S1101, as a result of the operation, the client application 110 transmits the user name of the print destination user and the specified file to the messaging service application 220 of the web conference system 200.

In step S1102, upon reception of the file to be printed, the messaging service application 220 issues a file upload notification to the bot application 310 of the bot application server 300. This notification includes at least the identification information of the message transmission source user and the identification information of the print destination user transmitted in step S1101. These pieces of identification information may be unique to the client application 110. If the client application 110 is configured to prompt the user to perform login, these pieces of identification information may be unique to the login user. According to the present exemplary embodiment, description will be give below using an example where the identification information is a client user name.

In step S1103, upon reception of the file upload notification, the bot application 310 issues a file acquisition request to the messaging service application 220.

In step S1104, upon reception of the file acquisition request, the messaging service application 220 transmits the requested file to the bot application 310 as a response.

In step S1105, the bot application 310 refers to the management table 1001 by using the user name of the print destination user included in the notification received in step S1102 as a key and identifies the printer ID of a printer that performs printing. For example, the user name "B" is specified in the print request message 1201. The bot application 310 thus identifies the printer ID "35126" corresponding to the client user name "B" by referring to the table in FIG. 10A.

In step S1106, the bot application 310 generates print request information. The print request information includes print setting information, the identification information of the message transmission source user included in the notification in step S1102, the identification information of the print destination user, the file to be printed, and the printer ID identified in step S1105.

In step S1107, the bot application 310 transmits a print request to the web application 430. The print request includes the print request information generated in step S1106 and the application ID assigned to the bot application 310 by the print service 420 ("BOT0001" in this example). In other words, the processing in step S1107 is print request processing for printing the file to be printed by using the printing apparatus corresponding to the user identification information included in the print request message 1201.

In step S1108, the web application 430 searches for the application ID included in the received print request and the printer ID included in the print request information in the management table 1002. Then, the web application 430 confirms whether the bot application 310 is permitted to use the printer 720. A case where the bot application 310 is permitted to use a printer refers to a case where a set of the application ID and the printer ID is registered in the management table 1002.

In a case where the bot application 310 is permitted to use the printer 720, then in step S1109, the web application 430 stores, in the file storage 410, the file to be printed included in the print request information.

In step S1110, the web application 430 generates a print job based on the file stored in the file storage 410 and the print setting information included in the print request. Specifically, for example, when the color mode is "Color", the web application 430 generates a print job for color printing. When the color mode is "Monochrome", the web application 430 generates a print job for monochrome printing. When the paper size is "A3", the web application 430 generates a print job for A3. When the paper size is "B5", the web application 430 generates a print job for B5.

In step S1111, the web application 430 transmits the generated print job to the print service 420.

In step S1112, upon reception of the print job, the print service 420 issues a print job notification to the printer 720.

In step S1113, upon reception of the print job notification, the printer 720 issues a print job request to the print service 420.

In step S1114, upon reception of the print job request, the print service 420 transmits a print job to the printer 720 as a response to the request.

In step S1115, upon reception of the print job, the printer 720 outputs data based on the print job by using the output apparatus of the printer 720 corresponding to the output apparatus 506 in FIG. 4. In other words, the file to be printed included in the print request message 1201 is printed in the processing in step S1115.

In step S1116, upon completion of the output processing, the printer 720 issues a print result notification to the print service 420.

In step S1117, upon reception of the print result notification, the print service 420 transmits the print result notification to the web application 430.

In step S1118, the web application 430 then transmits the print result notification to the bot application 310.

In step S1119, upon reception of the print result notification, the bot application 310 generates a message for notifying the messaging service application 220 of the print result, and issues a message transmission request to the messaging service application 220.

In step S1120, upon reception of the print result message transmission request, the messaging service application 220 transmits a print result message to the client applications 110 and 610. The client applications 110 and 610 display a print result message 1202 including the print destination user information in the talk screen, as illustrated in FIG. 12. Then, this processing sequence is ended.

[Printing Operation]

A case where the client application 110 instructs the printer of the user B different from the user of the client application 110 to print the file to be printed will be described below. Screen display at the time of the printing operation will be described below with reference to FIGS. 13A and 13B.

Figure 13B:
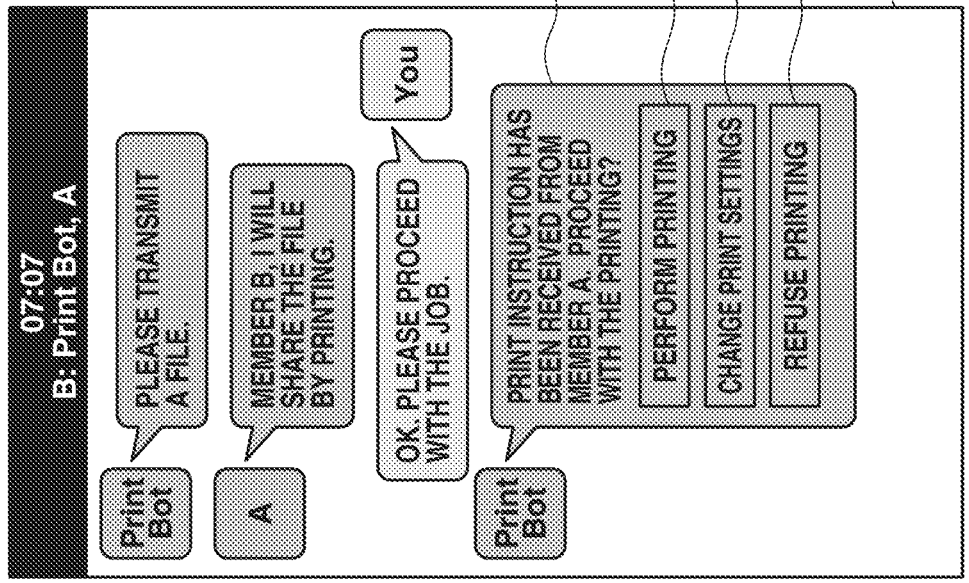
FIGS. 13A, 13B, 13C, and 13D illustrate printing operations.
Figure 13A:
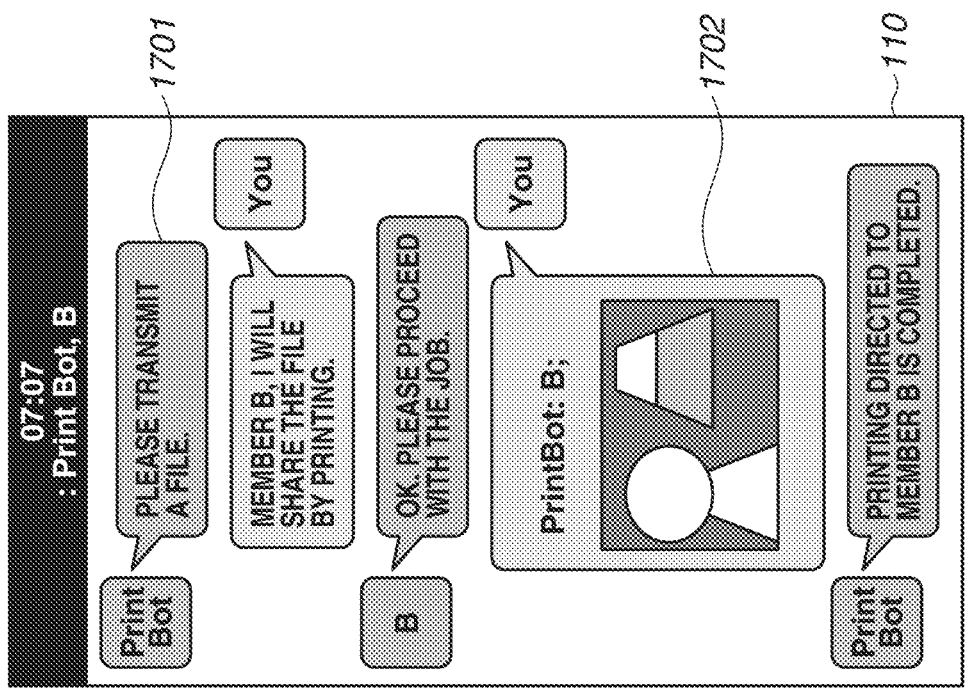

FIG. 13A illustrates an example of a message talk screen displayed on the display apparatus 104 of the client terminal 100 by the client application 110. According to the present exemplary embodiment, the user name of the client application 110 is "A". In the message talk screen provided by the client application 110, messages and files transmitted between the user A and the partner of the talk are sequentially displayed from the top downward in time series. In this example, the dialog balloons on the left-hand side of the screen indicate messages transmitted from the participants of the web conference other than the user A, and dialog balloons on the right-hand side of the screen indicate messages and images transmitted from the user A of the client application 110. In the example in FIG. 13A, the participants of the web conference other than the user A are the user B and the bot application 310 as a virtual user, which are displayed as "B" and "Print Bot", respectively. The icons on the leftmost side of the screen are displayed as "B" and "Print bot". Similarly, FIG. 13B illustrates an example of a message talk screen displayed on the display apparatus of the client terminal 6000 by the client application 610. In the message talk screen provided by the client application 610, dialog balloons on the right-hand side of the screen indicate messages transmitted from the user B, and dialog balloons on the left-hand side of the screen indicate messages transmitted from the user A and the bot application 310 as a virtual user. The icons on the leftmost side of the screen are displayed as "A" and "Print Bot".

In both of the examples of FIGS. 13A and 13B, the bot application 310 transmits a message for requesting transmission of the file to be printed (a photograph in these cases) in step S1103. In FIG. 13A, the user A transmits a print request message 1702 including the file to be printed together with the identification information (Print Bot) as a message to the bot application and the user identification information of the print destination user (user name "B"), according to a predetermined format. The print request message 1702 is associated with a print request ID for uniquely identifying the print request. Upon reception of the print request message 1702, the bot application 310 determines that print processing is to be executed since the print request message 1702 includes the identification information as a message to the bot application and the print destination user name (Print bot: B;).

The bot application 310 stores initial print setting information and the file included in the print request message 1702 in the file storage 340 in association with the print request ID. Subsequently, the bot application 310 identifies the user B as a print destination user based on "Print bot: B" included in the print request message 1702. Then, the bot application 310 transmits a print operation message 1703 to the user B identified as a print destination user. In other words, upon reception of the print request message 1702, the bot application 310 transmits the print operation message 1703 to the user corresponding to the user identification information included in the print request message 1702. The print operation message 1703 includes buttons 1704 to 1706 in addition to a text (sentence) indicating that a file has been received. The print request ID is associated with the print operation message 1703. These buttons allow the user to send a fixed message to the partner of the message talk and to change the settings to activate a web browser and access a specific Uniform Resource Locator (URL). The text (sentence) included in the print operation message 1703 is an example and may be other character strings. Although, in the example in FIG. 13B, buttons are included in the message, the configuration is not limited thereto. The message may include other objects. According to the present exemplary embodiment, the button 1704 may be also called a print object for receiving a print execution instruction, and the button 1705, a setting object for receiving the settings of the print setting information.

For example, when the user B presses the button 1704 in FIG. 13B, a print request instruction message is transmitted from the client application 610 to the messaging service application 220. Since the print request instruction message includes the print request ID, the bot application 310 performs print processing by using the file corresponding to the print request ID. When the user B presses the button 1705, an instruction is issued to open the URL for accessing a web page for updating the print settings included in the print operation message 1703. In this case, an instruction for activating the web browser 620 of the client terminal 6000 is issued from the client application 610.

The present exemplary embodiment has been described above based on the example where an operation for activating the web browser 620 to access a specific URL is executed when the button 1705 is pressed. However, a similar effect can be obtained in a configuration, for example, in which a direct link to a URL is displayed instead of buttons in the message, and the web browser 620 is activated when the user selects the link.

When the button 1705 in FIG. 13B is pressed, the web browser 120 requests a web application (not illustrated) of the bot application server 300 for a web page for updating the print settings. Upon reception of the web page request, the web application (not illustrated) acquires a corresponding print request ID based on the requested URL information from the database 330. The web application (not illustrated) generates a web page for print settings based on the initial print setting information stored in association with the acquired print request ID, and returns the web page to the client terminal 6000 as a response to the above-described request. In other words, when the button 1705 is operated by the user, the web application of the bot application 310 provides the client terminal 6000 with a print setting screen. When the button 1706 is pressed, a message for canceling the print request is transmitted from the client application 610 to the messaging service application 220. This cancel message includes the print request ID. Thus, the bot application 310 rejects a print instruction transmitted from the user A to the user B by the print request message 1702.

As another method, the user B may transmit in advance a print rejection message from the client application 610 to the messaging service application 220. When this print rejection message is transmitted to the bot application 310, the bot application 310 may make setting such that a print request is not transmitted from the user A and other users to the user B (i.e., such that the user B does not receive a print request). In other words, the messaging service application 220 transmits information indicating that the user B wants to refuse a print request to the bot application 310. The bot application 310 can update the printing permission/inhibition information of the user B stored in the database 330 to "print rejection" and make setting such that a print request from the user A and other users is not transmitted to the user B. For example, when the user B transmits a message "I refuse the print request from the user A" from the client application 610 to the messaging service application 220, the print request from the user A is not transmitted to the user B. Therefore, the user B does not receive a print request from the user A and can receive a print request from users other than the user A. For example, when the user B transmits a message "I refuse a print request from all of the members" from the client application 610 to the messaging service application 220, any print request from an arbitrary user is not transmitted to the user B. The user B thus does not receive any print request from an arbitrary user.

The user B transmits in advance a printing permission message from the client application 610 to the messaging service application 220. Based on this operation, the messaging service application 220 transmits printing permission information to the bot application 310 so that a print request is transmitted from the user A and other users (i.e., a print request is received by the user B). The bot application 310 can also update the printing permission/inhibition information of the user B stored in the database 330 to permit printing and then make setting such that a print request from the user A and other users is transmitted to the user B. For example, the user B transmits a message "I permit a print request from the user A" from the client application 610 to the bot application 310 via the messaging service application 220. The bot application 310 updates the printing permission/inhibition information of the user B stored in the database 330 to permit a print request from the user A. As a result, the user B can receive a print request from the user A. For example, the user B transmits a message "I permit a print request from all of the members" from the client application 610 to the bot application 310. The bot application 310 updates the printing permission/inhibition information of the user B stored in the database 330 to permit a print request from all of the members. As a result, the user B can receive a print request from an arbitrary user. The print rejection may be performed by other methods. For example, the user B may operate its own printer icon 1507 to switch between the print rejection and the print permission. Based on the above-described message exchange and icon operation, the bot application 310 determines whether the print rejection is specified such that the user corresponding to the user identification information included in the print request message 1702 refuses a print request. Then, when the bot application 310 determines that the print rejection is specified, the bot application 310 rejects the print request included in the print request message 1702. When the print rejection is specified, the bot application 310 may generate a print rejection message indicating that printing has been rejected and transmit the print rejection message to the print request source user (the user A according to the present exemplary embodiment).

Figure 13C:
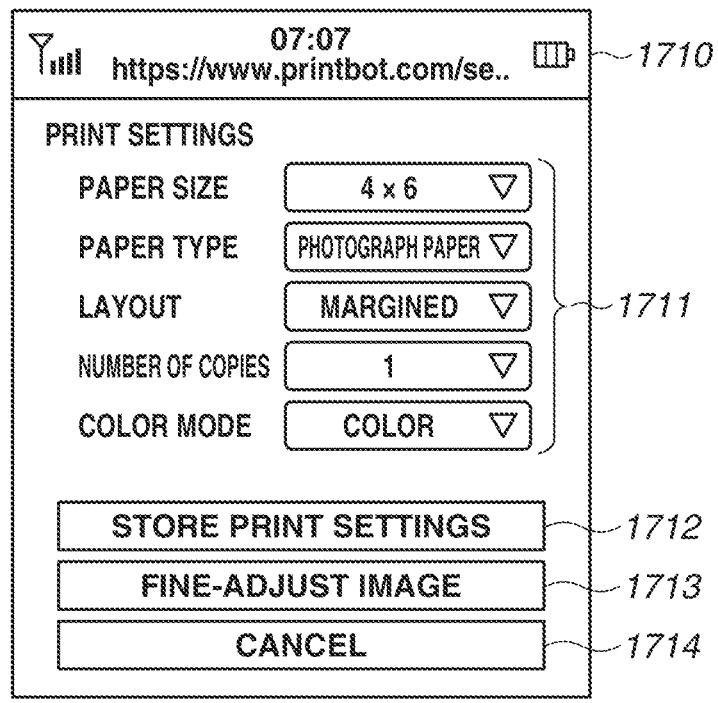

FIG. 13C illustrates an example of a print setting screen 1710 for making print setting returned from the web application (not illustrated) of the bot application server 300.

According to the present exemplary embodiment, the print setting screen 1710 is a web page. The user can change the setting value of each print setting item, such as a paper size and a paper type, by using fields provided as setting items 1711 in the print setting screen 1710. The print settings included in the setting items 1711 are examples, and may include other print settings according to the function of the printer 500. For example, for a color printer, two different options "Color" and "Monochrome" are displayed as color modes. For a monochrome printer, only an option "Monochrome" is displayed as a color mode. For a certain printer, three different options "High quality", "Standard", and "Draft" may be displayed as print quality. For other printers, two different options "Standard", and "Draft" may be displayed as print quality. For a paper size option and a paper type option, different options may be displayed for each printer. When a button 1712 at the bottom of the print setting screen 1710 is pressed, the setting value of the currently selected print setting item and settings made in an adjustment screen 1720 for adjusting a printing area of an image in FIG. 13C (described below) are fixed, and then the print setting screen 1710 is closed. In other words, the bot application 310 updates the initial print setting information corresponding to the print setting screen 1710 and stored in association with the print request ID to the values set by using the screens illustrated in FIGS. 13C and 13D. When a button 1713 is pressed, the screen changes to the adjustment screen 1720 for adjusting a printing area of an image illustrated in FIG. 13D. When a button 1714 is pressed, the content of the print settings changed so far is canceled. At the same time, the web browser 120 is ended and closed.

Figure 13D:
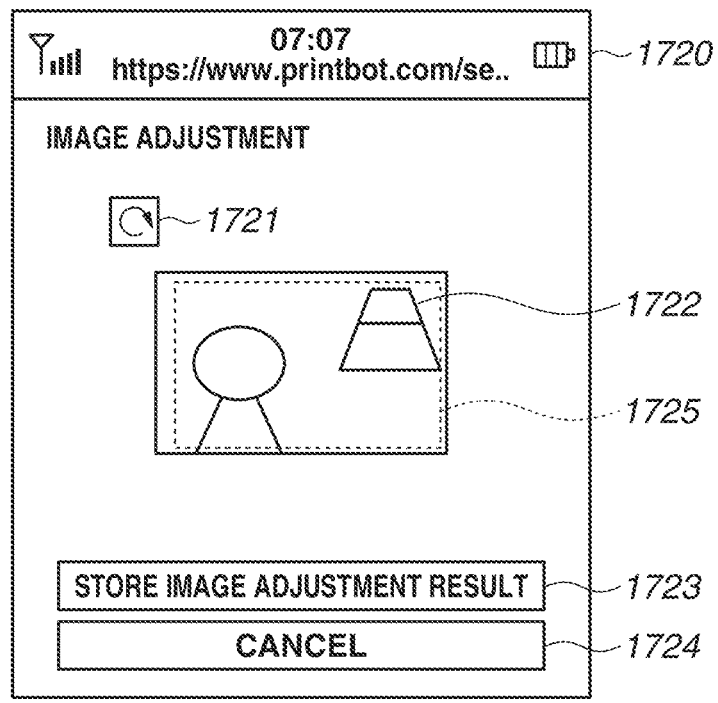

The adjustment screen 1720 for adjusting a printing area of an image illustrated in FIG. 13D displays a preview image of the file to be printed in an image region 1722. Further, a rectangular area 1725 (the area surrounded by broken lines) having the same aspect ratio as the paper size set as the setting item 1711 in the print setting screen 1710 in FIG. 13C is superimposed on the image region 1722. The user can adjust the printing area by translating, enlarging, and reducing the image region 1722. When a rotation button 1721 is pressed, the image displayed in the image region 1722 is rotated with respect to the rectangular area of the paper size. When a button 1723 is pressed, the bot application 310 updates the information corresponding to the image printing area adjustment screen 1720 for adjusting a printing area of an image and stored in association with the print request ID to the positional information on the image such as the changed position and magnification and rotation information. The screen display of the web browser 620 returns to the print setting screen 1710 illustrated in FIG. 13C. When a cancel button 1724 is pressed, the operation performed in the screen in FIG. 13D is canceled, and the screen display returns to the print setting screen 1710 illustrated in FIG. 13B.

In response to user operations on the screens illustrated in FIGS. 13C and 13D, the bot application 310 associates the print request ID and the file to be printed with the information set in the screens in FIGS. 13C and 13D and then stores these pieces of information.

The processing of transmitting the print operation message 1703 and the operations in the screens in FIGS. 13B and 13C may be performed in steps S1104 to S1106 in FIG. 11.

When the above-described operations are performed, a talk screen including the print operation message 1703 illustrated in FIG. 13B is redisplayed in the client terminal 6000. When the user B presses the button 1704, a print request instruction message is transmitted from the client application 610 to the messaging service application 220. Since the print request instruction message includes the print request ID, the bot application 310 performs print processing by using the file associated with the print request ID and the print setting information. In other words, if the print setting information is updated by using the screens in FIGS. 13C and 13D, then in step S1106, the bot application 310 generates print request information for printing the file included in the print request message 1702 based on the updated print setting information. Thus, the print setting information included in the print request information transmitted in step S1107 is the print setting information that has been changed by using the screens in FIGS. 13C and 13D.

The subsequent processing has been described above as the processing in S1107 and subsequent steps in FIG. 11, and detailed descriptions thereof will be omitted.

According to the present exemplary embodiment, the user A instructs the printer of the user B to perform printing with a simple operation, thus the user convenience can be improved.

Other Exemplary Embodiments

In the above-described exemplary embodiment, the user A of the client application 110 issues a file print instruction to one partner (user B) of the talk via the BOT application 310. On the other hand, in the web conference system, the user A can exchange messages with two or more other users. In this case, the user A specifies a plurality of print destination users or all of the members in the talk as destinations, together with the identification information as a message to the bot application and the file to be printed according to a predetermined format in the BOT application 310. Then, when the print request message is transmitted, the printers of the plurality of users are instructed to print the file. Screen display when the printing operation is performed in this case is illustrated in FIGS. 14A and 14B.

Figure 14B:
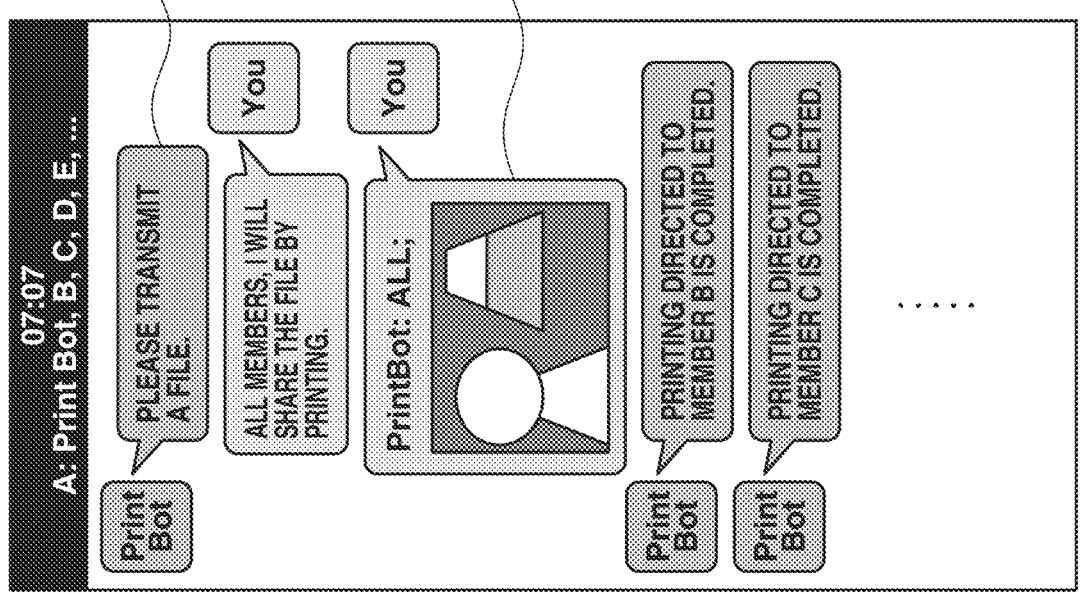
FIGS. 14A and 14B illustrate printing operations directed to a plurality of printers.
Figure 14A:
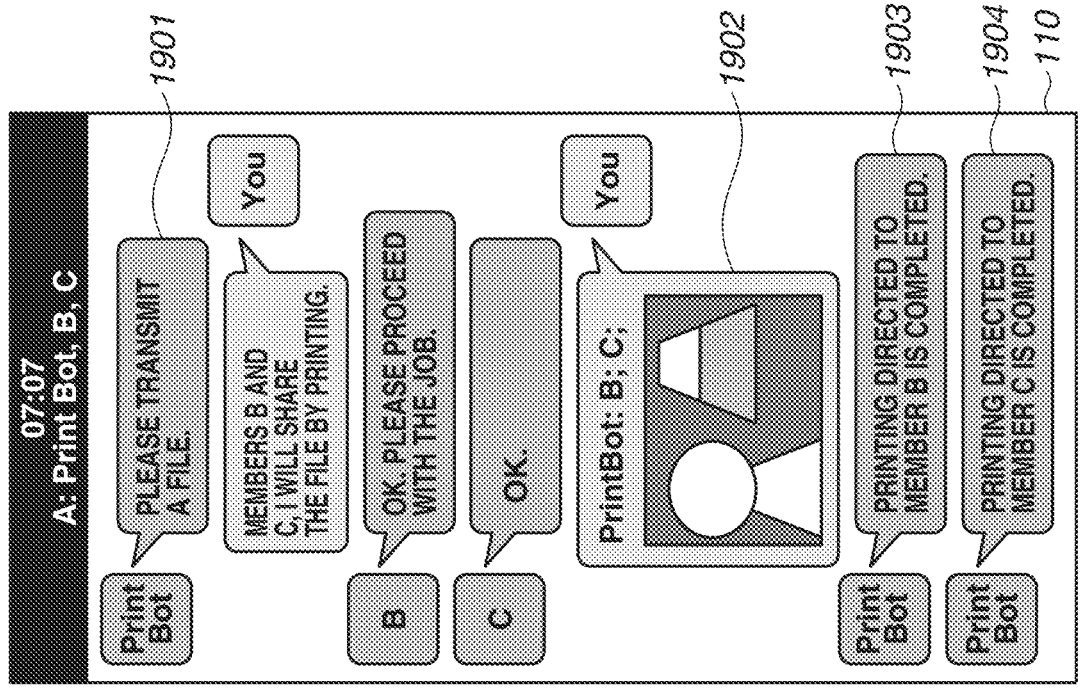

FIG. 14A illustrates a print transmission source message talk screen when a print request is given to a plurality of users participating in the web conference as a plurality of print destination users. A message 1902 includes the file to be printed together with the identification information (Print bot) as a message to the bot application and the user names of the print destination users (B and C) according to a predetermined format. When the user A transmits the message 1902, the bot application 310 identifies the two users (B and C) as print destination users, and issues print instructions by using the printer IDs associated with these users. When the printers of the user B and C complete printing, then in step S1119, a print result message transmission request is issued from the bot application server according to a predetermined procedure. Accordingly, print result messages 1903 and 1904 are notified to the client application 110 on the client terminal 100 of the user A.

FIG. 14B illustrates a print transmission source message talk screen in which all of the participants of the web conference are specified as print destination users. A message 1905 includes the file to be printed together with the identification information (Print bot) as a message to the bot application and the information indicating that all of the participants are print destination users (ALL) according to a predetermined format.

If the messaging service application 220 receives the message 1905 and recognizes that "ALL" is specified as print destination users, the messaging service application 220 identifies the user names of all of the participants of the web conference (e.g., A, B, and C). Then, the messaging service application 220 generates information about all of the identified participants other than the message transmission source user (i.e., B and C) and issues a file upload notification thereto. This processing enables the bot application 310 to issue a print instruction to all of the participants of the web conference.

The file to be printed may be photographic data or document data. The file to be printed may be also referred to as printing target content.

Although, in the above-described exemplary embodiment, messages are exchanged and a file to be printed is transmitted and received by using the messaging service application 220, the configuration is not limited thereto. Other configurations are also applicable. For example, the client applications 110 and 610 may not be applications for a web conference system but applications for the messaging service application 220. In this case, the participants of the web conference are partners of a talk.

The present disclosure can also be achieved by processing in which a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

The present disclosure makes it easier to issue a print instruction.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-124530, filed Jul. 21, 2020, which is hereby incorporated by reference herein in its entirety.

What is claimed is:

1. A system comprising:
a client terminal comprising at least one processor causing the client terminal to act as:
a display controller configured to display a message transmitted from a user different from a user of the client terminal; and
a transmission unit configured to transmit a print request message including user identification information of the user different from the user of the client terminal and a file to be printed, and
a server comprising at least one processor causing the client terminal to act as:
a request unit configured to perform print request processing for printing the file to be printed by using a printing apparatus corresponding to the user identification information included in the print request message.

2. The system according to claim 1, wherein the server further includes a transmission unit configured to transmit a print operation message to a user corresponding to the user identification information included in the print request message in a case where the server receives the print request message.

3. The system according to claim 2, wherein the print operation message includes a print object for receiving a print execution instruction and a setting object for receiving settings of print setting information.

4. The system according to claim 3, wherein the server further includes a provision unit configured to provide a client terminal of the user corresponding to the user identification information with a print setting screen in a case where the setting object is operated.

5. The system according to claim 1,
wherein the display controller causes pieces of participant information about participants of a web conference to be displayed, and
wherein the transmission unit of the client terminal transmits the print request message including user identification information corresponding to a piece of participant information selected from the pieces of participant information.

6. The system according to claim 1,
wherein the server further includes a determination unit configured to determine whether a user corresponding to the user identification information included in the print request message has set print rejection to reject printing, and
wherein a print request by the print request message is rejected in a case where it is determined that the print rejection has been set.

7. A non-transitory storage medium storing a program that, when executed, causes a client terminal comprising at least one processor causing the client terminal to act as:
a display controller configured to display a message transmitted from a user different from a user of the client terminal; and
a transmission unit configured to transmit a print request message including user identification information of the user different from the user of the client terminal and a file to be printed, wherein a server with which the client terminal communicates performs print request processing for printing the file to be printed by using a printing apparatus corresponding to the user identification information included in the print request message.

8. The storage medium according to claim 7,
wherein the display controller causes pieces of participant information about participants of a web conference to be displayed, and
wherein the transmission unit transmits the print request message including user identification information corresponding to a piece of participant information selected from the pieces of participant information.

9. A non-transitory storage medium storing a program that, when executed, configures a server to communicate with a client terminal that displays a message transmitted from a user different from a user of the client terminal on a display unit of the client terminal and transmits a print request message including user identification information of the user different from the user of the client terminal and a file to be printed to function as a request unit configured to perform print request processing for printing the file to be printed by using a printing apparatus corresponding to the user identification information included in the print request message.

10. The storage medium according to claim 9, wherein execution of the program further configures the server to function as a transmission unit configured to, upon reception of the print request message, transmit a print operation message to a user corresponding to the user identification information included in the print request message.

11. The storage medium according to claim 10, wherein the print operation message includes a print object for receiving a print execution instruction and a setting object for receiving settings of print setting information.

12. The storage medium according to claim 11, wherein execution of the program further configures the server to function as a provision unit configured to provide the client terminal with a print setting screen.

13. The storage medium according to claim 9,
wherein execution of the program further configures the server to function as a determination unit configured to determine whether a user corresponding to the user identification information included in the print request message has set print rejection to reject printing, and
wherein a print request by the print request message is rejected in a case where it is determined that the print rejection has been set.

* * * * *